No. 720,506. PATENTED FEB. 10, 1903.
D. E. VAN GILDER.
WASHBOARD ATTACHMENT.
APPLICATION FILED MAY 24, 1902.
NO MODEL.
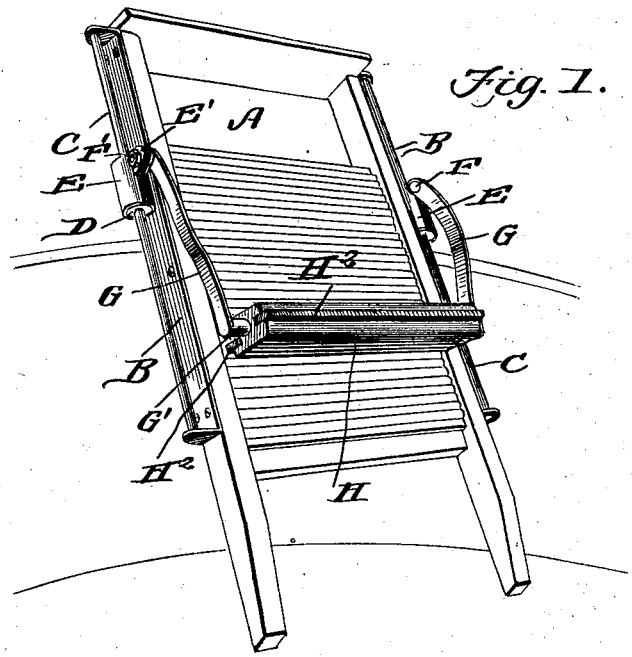
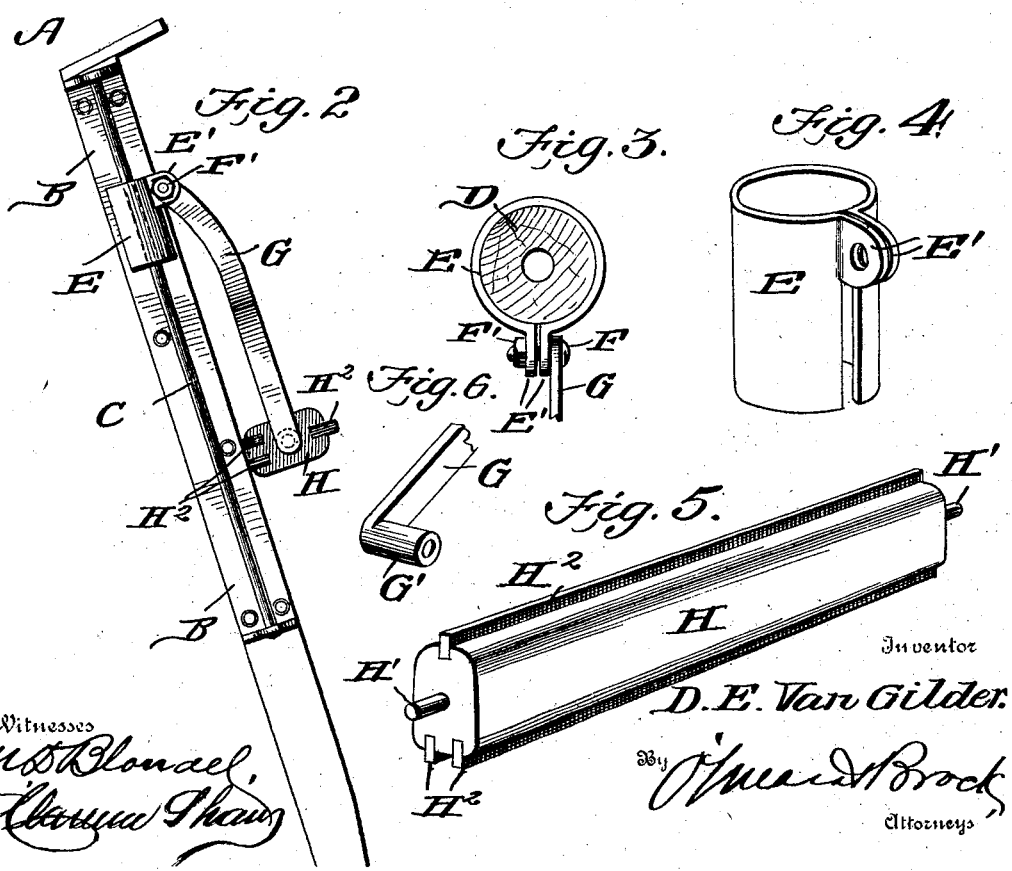

UNITED STATES PATENT OFFICE.

DIOCLEATION E. VAN GILDER, OF TOLEDO, OHIO.

WASHBOARD ATTACHMENT.

SPECIFICATION forming part of Letters Patent No. 720,506, dated February 10, 1903.

Application filed May 24, 1902. Serial No. 108,804. (No model.)

*To all whom it may concern:*

Be it known that I, DIOCLEATION E. VAN GILDER, a citizen of the United States, residing at Toledo, in the county of Lucas and State of Ohio, have invented a new and useful Washboard Attachment, of which the following is a specification.

This invention is a rubber attachment adapted for use in connection with a washboard, whereby the rubbing operation is quickly and easily accomplished without injury to either the clothes or hands of the operator.

The object of the invention is to provide an attachment which can be used in connection with the ordinary washboards now in common use; and with this object in view the invention consists, essentially, of a pair of bracket-plates adapted to be secured to the side pieces of a washboard, each bracket-plate carrying a guide-rod upon which slides a block to which is pivotally connected an arm, said arms carrying a rubber at their free ends, said rubber being capable of a reciprocatory movement across the face of the washboard.

The invention consists also in certain further details of construction and combination, all of which will be fully described hereinafter and pointed out in the claims.

In the drawings forming part of this specification, Figure 1 is a perspective view of a washboard provided with my attachment. Fig. 2 is a side view of the same. Fig. 3 is a detail sectional view taken through the sliding block and split collar surrounding the same. Fig. 4 is a detail perspective view of the said collar and showing the integral ears. Fig. 5 is a detail perspective view of the rubber. Fig. 6 is a detail view showing the bearings for the trunnions of the rubber.

Referring to the drawings, A indicates an ordinary washboard, and to each one of the side pieces is secured the bracket-plate B, carrying the guide-rod C, and sliding upon each guide-rod is a block D, preferably cylindrical in form and surrounded by means of a split collar E, having integral ears E', and passing through the said ears is a bolt F, secured by the nut F', said bolt serving to clamp the split collar to the sliding block and also to serve as a pivot for the arm G, each arm having an inwardly-projecting tubular bearing G' at its lower end and in which are journaled the trunnions H' of the rubber H, said rubber consisting of a strip of wood having two of its oppositely-disposed faces grooved to receive the rubber-strips $H^2$, and in practice I prefer to have one strip arranged upon one face and two strips in the opposite face.

In operation the clothes to be rubbed are placed upon the washboard the same as usual; but instead of rubbing the clothes upon the face of the washboard by hand the clothes are held upon the washboard and rubbed over the corrugated surface thereof by pressing upon the rubber H and reciprocating the same over the face of the washboard, the sliding block and guide-rods permitting such movement. The rubber being reversible, either face can be employed, as preferred.

Having thus fully described my invention, what I claim as new, and desire to secure by Letters Patent, is—

1. The combination with the bracket-plates, of the guide-rods carried thereby, blocks sliding upon said guide-rods, the collars surrounding the blocks, the arms pivotally connected to the said collars, and a rubber pivotally mounted between the ends of the arms, substantially as described.

2. The combination with the bracket-plates, of the guide-rods, blocks sliding upon said guide-rods, the split collars surrounding the blocks and having integral ears, the arms pivoted to the said ears and having tubular bearings at their lower ends, and the rubber-block having trunnions at its ends working in said bearings, and rubbing-strips inserted in its opposite faces, substantially as shown and described.

D. E. VAN GILDER.

Witnesses:
H. A. AYER,
G. W. WINTERS.